Patented Nov. 7, 1922.

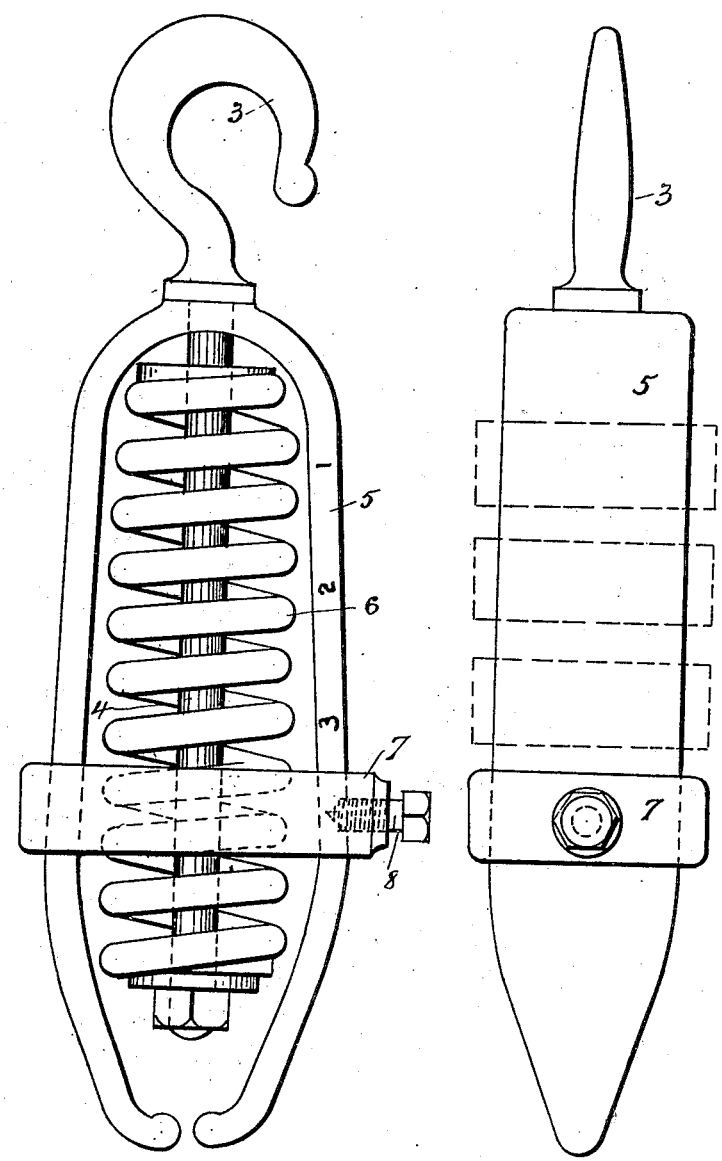

1,434,931

UNITED STATES PATENT OFFICE.

WILLIAM EWART TUCKER, OF WINNALEAH, TASMANIA, AUSTRALIA.

RELEASABLE COUPLING.

Application filed August 31, 1921. Serial No. 497,351.

*To all whom it may concern:*

Be it known that I, WILLIAM EWART TUCKER, a subject of the King of Great Britain, residing at "Northholme," Winnaleah, in the State of Tasmania, Commonwealth of Australia, agriculturalist, have invented certain new and useful Improvements in Releasable Couplings, of which the following is a specification.

My invention relates to couplings of the type having releasing means that are used between tractors and heavy drawn vehicles of various kinds.

One of the objects of the invention is to provide a compact and economical coupling that will be released should the draft become excessive or the drawn vehicle be stopped suddenly by an obstruction or become bogged, thereby avoiding fracture of the draft parts.

A further object the invention has in view is to adjust the coupling to release at approximately a predetermined draft pressure.

With the usual type of coupling there is a grave danger of breaking the hauling gear or of even more serious consequences when the movement of the drawn vehicle is suddenly arrested by an obstruction.

In this invention, a stout springy link is employed that is open at one end, the draft hook being attached at the forward or closed end, while the draft chains are connected to the link at the open end. The draft hook can be integral with a bolt on or within the link or coupling and will carry a stout compression spring that in operation will seat between a washer on the bolt end and the inside of the closed end of the link. Further, the latter may taper slightly towards its forward end and carry a collar adapted to be slid along and held upon the same.

But in order to fully understand the said invention reference is made to the accompanying drawings, in which—

Figure 1 is a plan of the draft link, hook, compression spring and adjustable collar, and Figure 2 is a side elevation of the link.

The draft hook 3 is integral with the rod or bolt 4 that passes through the closed end of the steel coupling or link 5. Surrounding the rod is the spiral spring 6 and on the rear end of the rod is a washer and nut, the spring seating on the washer when the hook 3 is drawn forward, the other end of the spring being compressed against the link end.

The sides of the link 5 may be parallel or can slightly taper towards the hook 3, while the rear end is open to permit the sides to be sprung outwards. The draft connections are attached at the open end, the draft occurring through the hook 3, link or frame 5 and the said connections. The spring is useful in equalizing the draft but is not indispensable to the invention. By virtue of the link 5, when the draft pressure from any cause exceeds a predetermined limit the jaws of the link will open and release the connections.

To adjust the tension of the link 5 the collar 7 is placed around same and can be secured thereto such as by the set screw 8. If the collar be in the position indicated in Figure 1 the pressure upon the jaws will need to be greater to open the same than when the collar is placed further forward on the link. The side of the link may be marked to indicate the approximate pressure required to cause the link or frame to open. Thus, by the simple, compact and effective means described, damage to the draft gear through sudden interruptions to the draft is avoided.

The improved coupling will be used principally upon agricultural implements but same may be employed in all cases involving heavy traction. It will likewise be evident that the draft equalizing spring can be interposed in the draft connections elsewhere than in the coupling or link in which the spring is compressed in operation, while if placed outside the link and in, say the draft chains, it will be elongated when the draft is applied. The form illustrated is, however, to be preferred on account of its compactness and efficiency. The invention might also be used on vehicles of lighter draft that are horse drawn without altering the same, save to make the parts of lighter materials.

Having now described my invention what

I claim as new and desire to secure by Letters Patent is:—

1. In means of the kind indicated, a springy link open at one end in combination with a draft hook at the closed end and a movable collar about the link, as specified.

2. In means of the kind indicated, a springy link open at one end, in combination with a draft hook at the closed end, a movable collar about the link, and means to secure said link in adjusted position.

In witness whereof I affix my signature.

WILLIAM EWART TUCKER.